(12) United States Patent
Satoh et al.

(10) Patent No.: US 9,689,613 B2
(45) Date of Patent: Jun. 27, 2017

(54) CONTINUOUS HEATING FURNACE

(71) Applicant: IHI Corporation, Tokyo (JP)

(72) Inventors: Kimiyoshi Satoh, Tokyo (JP); Kazuo Miyoshi, Tokyo (JP); Takahiro Tanaka, Tokyo (JP)

(73) Assignee: IHI CORPORATION (JP)

( * ) Notice: Subject to any disclaimer, the term of this patent is extended or adjusted under 35 U.S.C. 154(b) by 0 days.

(21) Appl. No.: 14/843,195

(22) Filed: Sep. 2, 2015

(65) Prior Publication Data

US 2015/0377553 A1    Dec. 31, 2015

Related U.S. Application Data

(63) Continuation of application No. PCT/JP2014/055963, filed on Mar. 7, 2014.

(30) Foreign Application Priority Data

Mar. 8, 2013 (JP) .................................. 2013-047305

(51) Int. Cl.
*B03C 3/01* (2006.01)
*F23C 9/08* (2006.01)
(Continued)

(52) U.S. Cl.
CPC ............... *F27B 9/068* (2013.01); *F23C 3/00* (2013.01); *F23D 14/12* (2013.01); *F27B 9/20* (2013.01);
(Continued)

(58) Field of Classification Search
CPC ...... F27B 9/24; F27B 9/36; F27B 9/40; F27B 9/068; F27B 9/20; F27D 17/00;
(Continued)

(56) References Cited

U.S. PATENT DOCUMENTS 4,493,308 A    1/1985 Hurley ......................... 126/41 R
4,553,526 A *  11/1985 von Conta ............... F24B 1/026
                                              110/213
(Continued)

FOREIGN PATENT DOCUMENTS

CN    1054577 A    9/1991
CN    2682357 Y    3/2005
(Continued)

OTHER PUBLICATIONS

International Search Report and Written Opinion mailed May 13, 2014 in corresponding PCT International Application No. PCT/JP2014/055963.
(Continued)

*Primary Examiner* — Alissa Tompkins
*Assistant Examiner* — Benjamin W Johnson
(74) *Attorney, Agent, or Firm* — Ostrolenk Faber LLP

(57) ABSTRACT

A continuous heating furnace includes one or a plurality of closed type gas heaters each having a combustion chamber, a guide section that guides an exhaust gas, an exhaust hole that discharges the exhaust gas and a first radiation surface that extends in a direction perpendicular to a baking object conveyance direction wherein the first radiation surface is heated by combustion in the combustion chamber and heat from the guide section and transfers radiant heat to the baking object. The continuous heating furnace also has at least one exhaust heat transfer unit that is juxtaposed with a corresponding closed type gas heater in the conveyance direction, wherein the at least one exhaust heat transfer unit has a second radiation surface that communicates with the exhaust hole of a closed type gas heater and is heated by the exhaust gas, and a heat transfer acceleration unit that accelerates heat transfer from the exhaust gas to the second radiation surface in a direction perpendicular to the conveyance direction of the second radiation surface.

10 Claims, 7 Drawing Sheets

(51) Int. Cl.
| | |
|---|---|
| *F23J 15/06* | (2006.01) |
| *F23L 15/04* | (2006.01) |
| *F23L 7/00* | (2006.01) |
| *F27B 9/06* | (2006.01) |
| *F27D 17/00* | (2006.01) |
| *F23D 14/12* | (2006.01) |
| *F27B 9/24* | (2006.01) |
| *F23C 3/00* | (2006.01) |
| *F27B 9/20* | (2006.01) |
| *F27D 99/00* | (2010.01) |

(52) U.S. Cl.
CPC ............... *F27B 9/24* (2013.01); *F27D 17/00* (2013.01); *F27D 17/004* (2013.01); *F27D 99/0035* (2013.01); *F27D 2099/0045* (2013.01); *Y02P 10/283* (2015.11)

(58) Field of Classification Search
CPC ...... F27D 17/004; F27D 99/035; F23D 14/12; F23D 14/125; F23C 3/00
USPC ......... 432/48, 128, 152, 121, 147, 146, 150, 432/148; 392/416, 417, 418, 420
See application file for complete search history.

(56) References Cited

U.S. PATENT DOCUMENTS

| | | | | |
|---|---|---|---|---|
| 4,951,648 | A * | 8/1990 | Shukla ..................... | A21B 1/48 126/21 A |
| 5,906,485 | A * | 5/1999 | Groff ....................... | A21B 1/48 432/121 |
| 8,272,320 | B2 * | 9/2012 | Baker ..................... | A21B 1/245 126/15 R |
| 2004/0177769 | A1 | 9/2004 | Kobayashi | |
| 2008/0003531 | A1 | 1/2008 | Abbasi .......................... | 431/215 |
| 2011/0041837 | A1 | 2/2011 | Kato et al. | |
| 2014/0106288 | A1 | 4/2014 | Satoh et al. | |
| 2016/0003482 | A1 | 1/2016 | Kato et al. | |

FOREIGN PATENT DOCUMENTS

| | | |
|---|---|---|
| CN | 2908488 Y | 6/2007 |
| CN | 101403569 A | 4/2009 |
| CN | 101932876 A | 12/2010 |
| EP | 0643261 A1 | 3/1995 |
| EP | 1 231 444 A2 | 8/2002 |
| EP | 2618053 A1 | 7/2013 |
| EP | 2754984 A1 | 7/2014 |
| EP | 2754985 A1 | 7/2014 |
| JP | 10-111078 | 4/1998 |
| JP | 2003-021462 | 1/2003 |
| JP | A-2007-212082 | 8/2007 |
| JP | 2013-029217 | 2/2013 |
| JP | B-5143507 | 2/2013 |
| TW | 373063 | 11/1999 |
| TW | 448285 | 8/2001 |
| WO | WO 91/11397 A1 | 8/1991 |
| WO | WO 2013/015240 A1 | 1/2013 |
| WO | WO 2013/035593 A1 | 3/2013 |
| WO | WO 2013/035595 A1 | 3/2013 |

OTHER PUBLICATIONS

Notice of Allowance and Search Report mailed May 18, 2015 in corresponding Taiwanese Patent Application No. 103107828, along with English language translation of the Search Report.

* cited by examiner

CONTINUOUS HEATING FURNACE

TECHNICAL FIELD

The present disclosure relates to a continuous heating furnace configured to combust fuel and heat a baking object.

This application is a continuation application based on a PCT Patent Application No. PCT/JP2014/055963, filed on Mar. 7, 2014, whose priority is claimed on Japanese Patent Application No. 2013-47305, filed on Mar. 8, 2013. The contents of both the PCT Application and the Japanese Application are incorporated herein by reference.

BACKGROUND ART

In the related art, continuous heating furnaces configured to heat a radiator using combustion heat obtained by combusting a fuel gas, and heat conveyed baking objects such as industrial materials, foods, or the like using radiant heat from a radiation surface of the radiator are common. Among the baking objects, some baking objects should not be exposed to a fuel gas or an exhaust gas. For this reason, in the continuous heating furnace, a design configured to prevent the fuel gas or exhaust gas from being mixed with the atmosphere around the baking object may be required.

Here, a continuous heating furnace in which a combustion chamber in which a fuel gas is combusted is isolated from a heating chamber into which a baking object is conveyed has been proposed (for example, see Patent Document 1). In the continuous heating furnace, radiation surfaces are disposed at upper and lower sides in a vertical direction of the heating chamber configured to heat the baking object, and the baking object is heated using radiant heat from the radiation surfaces. A high temperature exhaust gas generated by combusting the fuel gas flows in back sides of the radiation surfaces.

CITATION LIST

Patent Document

[Patent Document 1] Japanese Unexamined Patent Application, First Publication No. H10-111078

SUMMARY

Technical Problem

In the case of the continuous heating furnace disclosed in Patent Document 1, the entire radiator is approximately uniformly heated in opposite directions of left and right walls by the exhaust gas.

However, in the furnace main body such as the heating chamber or the like into which the baking object is conveyed, the heat flux applied to an object to be heated decreases more easily at both end sides in a direction perpendicular to a conveyance direction in the furnace main body than a central side in the furnace main body due to radiation from the left and right walls or the like. For this reason, temperatures of portions of the baking object close to the both end sides decrease more easily than those of portions close to the central side.

In consideration of the above-mentioned circumstances, the present disclosure is directed to provide a continuous heating furnace capable of uniformizing a heat flux applied to an object to be heated in a furnace main body.

Solution to Problem

In order to solve the above-mentioned problems, a continuous heating furnace of the present disclosure includes a furnace main body; a conveyance unit configured to convey a baking object in the furnace main body; one or a plurality of closed type gas heaters each having an introduction hole into which a fuel gas flows, a combustion chamber in which the fuel gas introduced from the introduction hole is combusted, a guide section configured to guide an exhaust gas generated by combustion in the combustion chamber, a first radiation surface extending in a direction perpendicular to a conveyance direction of the baking object and configured to be heated by the combustion in the combustion chamber or heat of the exhaust gas flowing through the guide section to transfer radiant heat to the baking object, and an exhaust hole through which the exhaust gas that heated the first radiation surface is discharged, and disposed in the furnace main body; and one or a plurality of exhaust heat transfer units juxtaposed with the closed type gas heater in the conveyance direction of the baking object in the furnace main body and each having a second radiation surface that communicates with the exhaust hole of the closed type gas heater and configured to be heated by the exhaust gas to transfer the radiant heat to the baking object, and a heat transfer acceleration unit configured to accelerate heat transfer from the exhaust gas to the second radiation surface at one end side or the other end side in a direction perpendicular to the conveyance direction of the baking object in the second radiation surface.

The heat transfer acceleration unit may include an introduction path which is perpendicular to or inclined with respect to the second radiation surface and the exhaust gas flows therein, and may be configured such that the exhaust gas from the introduction path collides with a back side of the second radiation surface.

The heat transfer acceleration unit may be constituted by a turbulence section configured to disturb the flow of the exhaust gas flowing through the exhaust heat transfer unit.

In addition, the exhaust heat transfer units may be juxtaposed with a front side and a rear side in the conveyance direction of the baking object with respect to the closed type gas heater, and a flow direction of the exhaust gas that heats the exhaust heat transfer unit may be reversed by the exhaust heat transfer units juxtaposed with the front side and the exhaust heat transfer units juxtaposed with the rear side in the conveyance direction of the baking object.

Alternatively, the plurality of exhaust heat transfer units may be juxtaposed with at least the front side or the rear side in the conveyance direction of the baking object with respect to the closed type gas heater, and flow directions of the exhaust gases that heat the exhaust heat transfer units may be opposite to each other in the plurality of exhaust heat transfer units.

The plurality of closed type gas heaters may constitute a closed type gas heater system. Further, the closed type gas heater system may be divided into units constituted by one or a plurality of the closed type gas heaters, and each unit may include the exhaust heat transfer unit.

Advantageous Effects

According to the present disclosure, the heat flux applied to the object to be heated in the furnace main body can be uniformized.

DESCRIPTION OF EMBODIMENTS

Figure 1:
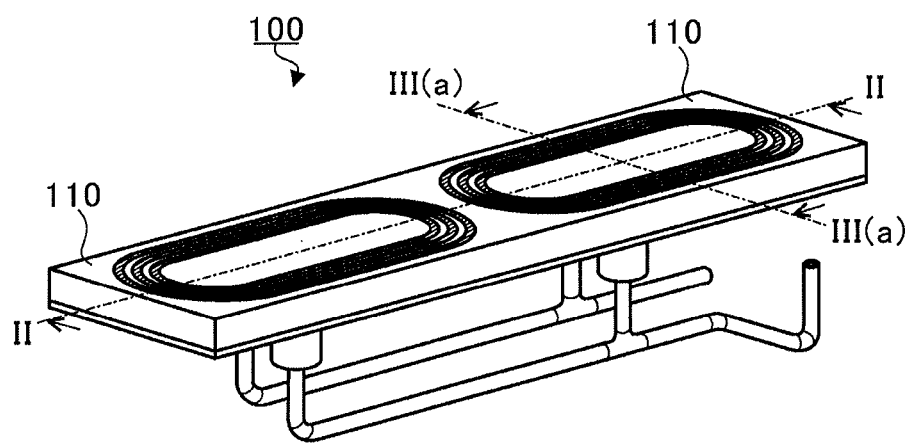
FIG. 1 is a perspective view showing an example of an appearance of a closed type gas heater system.

Hereinafter, an exemplary embodiment of the present disclosure will be described in detail with reference to the accompanying drawings. Dimensions, materials and other specific numerical values described in the embodiment are exemplarily provided for the purpose of easy understanding of the present disclosure but the present disclosure is not limited thereto unless the context clearly indicates otherwise. Further, in the specification and the drawings, elements having substantially the same functions and configurations are designated by the same reference numerals, an overlapping description thereof will be omitted, and elements not directly relating to the present disclosure will not be shown.

In a continuous heating furnace of the embodiment, a plurality of closed type gas heater systems are installed in a furnace. First, the closed type gas heater systems disposed in the furnace will be described, and then, the entire configuration of the continuous heating furnace will be described.

Closed Type Gas Heater System 100

Figure 2:
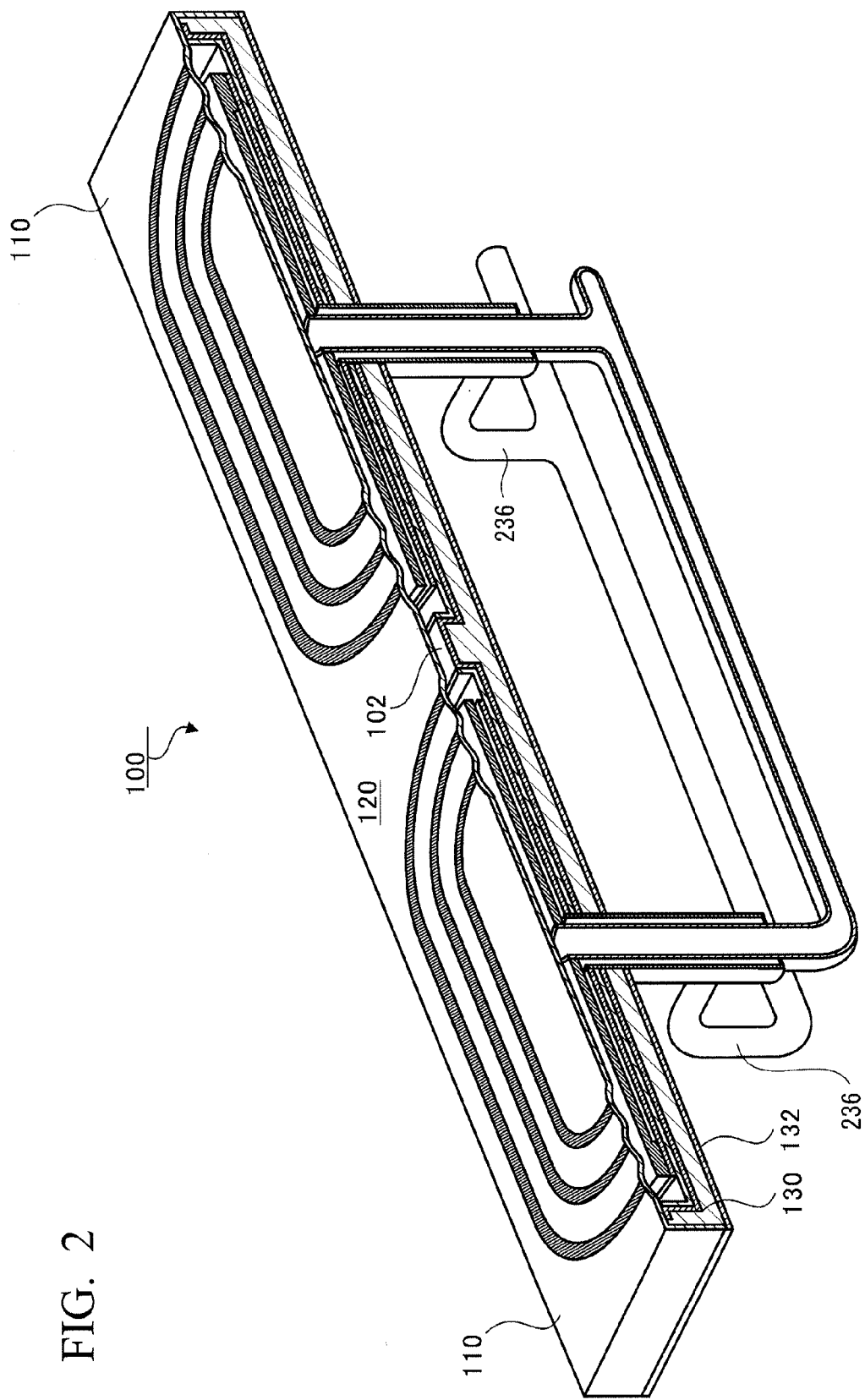
FIG. 2 is a perspective view showing a cross section taken along line II-II of FIG. 1.

FIG. 1 is a perspective view showing an example of the appearance of a closed type gas heater system 100, and FIG. 2 is a perspective view showing a cross section taken along line II-II of FIG. 1. While the closed type gas heater system 100 according to the embodiment is a pre-mixing type in which town gas or the like and air serving as an oxidizer gas for combustion are mixed before supply into a main container, the present disclosure is not limited thereto and may be a so-called diffusion type in which diffusion combustion is performed.

As shown in FIGS. 1 and 2, in the closed type gas heater system 100, a plurality of (here, two) closed type gas heaters 110 are continuously installed, a mixed gas (hereinafter referred to as "a fuel gas") of the town gas or the like and the air is supplied, and the fuel gas is combusted in the closed type gas heaters 110 to generate heat. Then, in the closed type gas heater system 100, an exhaust gas generated by the combustion is collected.

In addition, a fire spreading section 102 in communication with a closed space in the continuously installed closed type gas heaters 110 is formed at a connecting area between the closed type gas heaters 110. However, when the fire spreading section 102 is used in a gas, the closed space may not be completely closed.

In the closed type gas heater system 100 of the embodiment, for example, with one ignition by an ignition apparatus such as an igniter (not shown) or the like, a flame is spread and ignited in the continuously installed closed type gas heaters 110 through the fire spreading section 102. As described above, while the two closed type gas heaters 110 are installed in the closed type gas heater system 100, since both of the closed type gas heaters 110 have the same structure, only one of the closed type gas heaters 110 will be described.

Figure 3A:
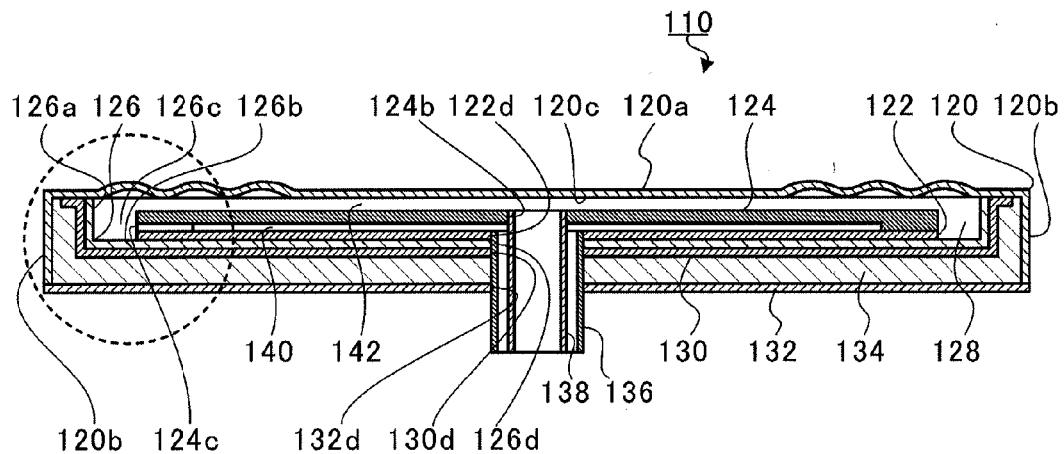
FIG. 3A is a cross-sectional view taken along line III(a)-III(a) of FIG. 1 for describing a closed type gas heater.
Figure 3B:
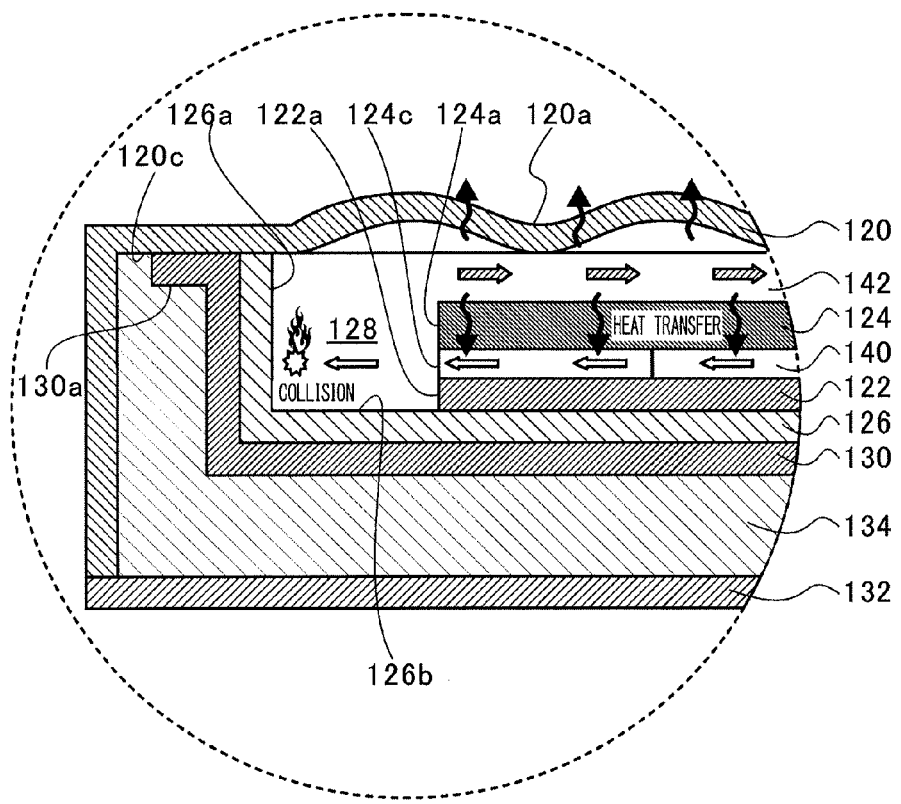
FIG. 3B is an enlarged view of a portion surrounded by a broken line of FIG. 3A.

FIGS. 3A and 3B are views for describing the closed type gas heater 110. FIG. 3A is a cross-sectional view taken along line III(a)-III(a) of FIG. 1, and FIG. 3B is an enlarged view of a portion surrounded by a broken line of FIG. 3A. In FIG. 3B, a white arrow represents a flow of a fuel gas, a hatched arrow represents a flow of an exhaust gas, and a black arrow represents movement of heat.

As shown in FIGS. 3A and 3B, the closed type gas heater 110 is configured to include a heating plate 120, a disposition plate 122, a partition plate 124, an insulating section 126, a combustion chamber 128, a closed section 130, a sealed section 132, an insulating material 134, a first pipeline section 136, a second pipeline section 138, an introduction section 140 and a guide section 142.

The heating plate 120 is a thin plate-shaped member formed of a material having a high heat resisting property and oxidation resistance such as stainless steel (SUS), a material having high thermal conductivity such as brass, or the like. The heating plate 120 has a first radiation surface 120a. The first radiation surface 120a is formed in a substantially rectangular shape (see FIG. 1), is heated by heat generated by the combustion, and transfers radiant heat to a baking object.

An outer wall section 120b of the heating plate 120 is curved at an outer circumferential end of the first radiation surface 120a to stand (extend) in a direction perpendicular to the first radiation surface 120a and spaced apart from the first radiation surface 120a (in FIG. 3A, a downward direction) to form a side surface of the closed type gas heater system 100.

In the embodiment, the heating plates 120 of the two closed type gas heaters 110 are integrally formed with each other (see FIG. 2). Then, the heating plate 120 has a hole constituted by an inner surface of the outer wall section 120b serving as a side surface and a back surface 120c of the first radiation surface 120a serving as a bottom surface, and components of the two closed type gas heaters 110 are disposed in the hole.

The disposition plate 122 is a flat plate-shaped member formed of a material having a high heat resisting property and oxidation resistance such as stainless steel, a material having low thermal conductivity, or the like. The disposition plate 122 is disposed to be substantially parallel to the back surface 120c of the first radiation surface 120a of the heating plate 120 inside the outer wall section 120b of the heating plate 120.

Like the heating plate 120, the partition plate 124 is a flat plate-shaped member formed of a material having a high heat resisting property and oxidation resistance such as stainless steel, a material having high thermal conductivity such as brass, or the like. The partition plate 124 is disposed to be substantially parallel to the disposition plate 122 between the back surface 120c of the heating plate 120 and the disposition plate 122 inside the outer wall section 120b of the heating plate 120.

In the disposition plate 122 and the partition plate 124, contours of outer circumferences (appearances) of opposite surfaces are approximately equal to each other, and each has a track shape (a shape in which two short sides of a rectangular shape are changed into line-symmetrical arcs (semi-circular shapes)).

The heating plate 120, the disposition plate 122 and the partition plate 124 may be disposed to be inclined to face each other when an aperture is formed therebetween. In addition, thicknesses of the heating plate 120, the disposition plate 122 and the partition plate 124 are not limited, and these plates are not limited to flat plates and may be formed in concavo-convex shapes.

The insulating section 126 is a thin plate-shaped member formed of a material with high thermal insulation (having thermal insulation), such as a ceramic or the like. The insulating section 126 has an outer circumferential section 126a and a bottom surface section 126b.

The outer circumferential section 126a is disposed at an outer circumferential side of the partition plate 124, and extends along the outer circumference of the partition plate 124 in opposite directions of the heating plate 120 and the disposition plate 122 (in FIG. 3A, upward and downward directions). The bottom surface section 126b is an area that is curved and continues from an area of the disposition plate 122 side (in FIG. 3A, a lower side) of the outer circumferential section 126a, extends toward a center of the disposition plate 122, and is disposed to face the heating plate 120.

Further, the insulating section 126 has a hole 126c constituted by the bottom surface section 126b serving as a bottom surface and the inner surface of the outer circumferential section 126a serving as a side surface, and a contour of the hole 126c has a track shape similar to the appearances of the disposition plate 122 and the partition plate 124. Then, the outer circumferential section 126a is spaced at equal intervals from an outer circumferential surface 122a of the disposition plate 122 and an outer circumferential surface 124a of the partition plate 124 via the hole 126c.

As shown in FIG. 3B, the combustion chamber 128 is disposed between the outer circumferential section 126a and the outer circumferential surfaces 122a and 124a of the disposition plate 122 and the partition plate 124, and faces the outer circumferential surfaces 122a and 124a. That is, the combustion chamber 128 has a space surrounded by the outer circumferential surfaces 122a and 124a, the heating plate 120 and the insulating section 126, and disposed inside the outer circumferential section 126a along the outer circumferential section 126a (i.e., a space overlapping the hole 126c).

The closed section 130 may be constituted by a thin plate-shaped member formed of a material having lower thermal insulation than the insulating section 126, for example, stainless steel or the like. In the embodiment, the closed sections 130 of the two closed type gas heaters 110 are integrally formed with each other (see FIG. 2).

In addition, as shown in FIG. 3B, the closed section 130 has a curved section 130a disposed at a contact portion between the closed section 130 and the back surface 120c of the first radiation surface 120a and extending in the surface direction of the back surface 120c (hereinafter, simply referred to as "a surface direction"), and the curved section 130a is joined to the back surface 120c of the heating plate 120 through welding, brazing, or the like. For this reason, gas leakage toward the insulating section 126 of the combustion chamber 128 is prevented or limited by the closed section 130.

Meanwhile, the insulating section 126 is not adhered to any contacting member, and the outer circumferential section 126a and the bottom surface section 126b of the insulating section 126 are covered and supported by the closed section 130 from an opposite side of the combustion chamber 128. As a result, the insulating section 126 is not adhered to any contacting member, and movement thereof is restricted such that relative positional deviation between the insulating section 126 and the closed section 130 does not occur due to the disposition plate 122 or the closed section 130.

The sealed section 132 is a flat plate-shaped member disposed at a side of the heating plate 120 opposite to the first radiation surface 120a. In the embodiment, like the heating plate 120, the sealed sections 132 of the two closed type gas heaters 110 are integrally formed with each other (see FIG. 2). Then, the sealed section 132 is fixed to an end section in a direction (in FIG. 3A, a downward direction) of the outer wall section 120b of the heating plate 120 at a position spaced apart from the closed section 130, and the insulating material 134 such as wool or the like having thermal insulation is sealed in a space between the sealed section 132 and the closed section 130.

In this way, the main container of the closed type gas heater system 100 is formed by closing the hole 126c of the heating plate 120 with the sealed section 132, and an area of upper and lower wall surfaces (outer surfaces of the first radiation surface 120a of the heating plate 120 and the sealed section 132) is larger than an area of an outer circumferential surface (an outer surface of the outer wall section 120b of the heating plate 120). That is, the upper and lower wall surfaces occupy most of the outer surface of the main container.

The first pipeline section 136 is a pipeline through which a fuel gas flows, and the second pipeline section 138 is a pipeline through which an exhaust gas flows. The second pipeline section 138 is disposed in the first pipeline section 136. That is, the first pipeline section 136 and the second pipeline section 138 form a double pipe at a portion which connects to the closed type gas heater 110.

Through-holes 122d, 126d, 130d and 132d passing in a thickness direction are formed in the disposition plate 122, the insulating section 126, the closed section 130 and the sealed section 132. The through-holes 122d, 126d, 130d and 132d have a positional relation in which the through-holes overlap in the central section in the surface direction of the disposition plate 122, the insulating section 126, the closed section 130 and the sealed section 132. The first pipeline section 136 is inserted into the through-holes 122d, 126d, 130d and 132d. Then, the end section of the first pipeline section 136 is fixed to the through-hole 122d of the disposition plate 122 at a position flush with a surface of the partition plate 124 side of the disposition plate 122, and a portion of the first pipeline section 136 inserted into the through-hole 130d of the closed section 130 is joined to the through-hole 130d through welding, brazing, or the like.

In addition, an exhaust hole 124b disposed at a position overlapping the through-hole 122d of the disposition plate 122, having a diameter smaller than the through-hole 122d and passing in the thickness direction is formed in the partition plate 124. The second pipeline section 138 is inserted into the exhaust hole 124b, and the end section of the second pipeline section 138 is fixed to the exhaust hole 124b at a position flush with a surface of the first radiation surface 120a side of the partition plate 124.

The end section of the second pipeline section 138 protrudes closer to the first radiation surface 120a than the end section of the first pipeline section 136 and is spaced apart from the heating plate 120, and the partition plate 124 is spaced at equal intervals from the heating plate 120 and the disposition plate 122 as the partition plate 124 is fixed to the end section of the second pipeline section 138 at a central side in the surface direction.

The introduction section 140 is formed by an aperture between the disposition plate 122 and the partition plate 124, and comes into communication with the first pipeline section 136. A fuel gas flows into the introduction section 140 from the through-hole 122d of the disposition plate 122 through the first pipeline section 136. That is, the through-hole 122d of the disposition plate 122 is an introduction hole through which the fuel gas flows into the introduction section 140. Then, the introduction section 140 radially guides the fuel gas flowed from the through-hole 122d (the introduction hole) of the disposition plate 122 toward the combustion chamber 128.

In addition, a flow path of the outlet side (the combustion chamber 128 side) of the introduction section 140 is partitioned into a plurality of sections by protrusions 124c disposed at the outer circumferential end section of the partition plate 124.

Figure 4:
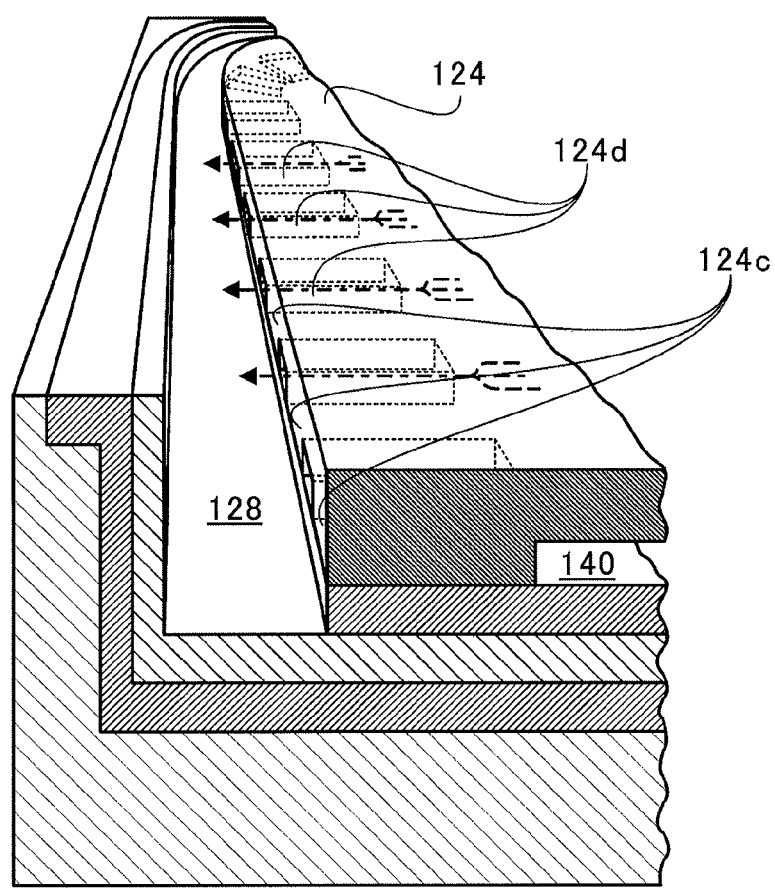
FIG. 4 is a view for describing a protrusion.

FIG. 4 is a view for describing the protrusion 124c, showing a perspective view of the combustion chamber 128 and a cross-sectional view of members that surround the combustion chamber 128. Further, here, for the purpose of understanding, the heating plate 120a is removed and contour line of a concealed portion of the partition plate 124 is shown by broken lines.

As shown in FIG. 4, the protrusions 124c are formed at equal intervals in the circumferential direction of the partition plate 124, and a flow path 124d is formed between the adjacent protrusions 124c. Accordingly, the introduction section 140 and the combustion chamber 128 come in communication with each other by the flow path 124d, a cross-sectional area of a communication portion of which is reduced. Here, an interval of the adjacent protrusions 124c, i.e., the width of the flow path 124d, is a representative dimension of a cross section of the flow path. Here, a quenching distance d of the fuel gas is represented by a size of a diameter of a tube wall model, and is obtained by the following Mathematical Formula 1.

$$d = 2\lambda \cdot Nu^{1/2}/(Cp \cdot \rho u \cdot Su) \quad \text{Mathematical Formula 1}$$

In Mathematical Formula 1, $\lambda$ is a thermal conductivity, Nu is a Nusselt number, Cp is an isopiestic specific heat, $\rho u$ is a density of a fuel gas, and Su is a combustion velocity. Since the width of the flow path 124d is designed to be smaller than the quenching distance d, stable combustion in the combustion chamber 128 becomes possible.

As shown in FIG. 3B, the fuel gas flowing into the combustion chamber 128 from the flow path 124d collides with the outer circumferential section 126a in the combustion chamber 128 and temporarily stays therein. The ignition apparatus is installed at the combustion chamber 128 of one of the two closed type gas heaters 110, and when the ignition apparatus ignites the fuel gas introduced from the introduction section 140, the closed type gas heater 110 also ignites the fuel gas in the combustion chamber 128 of the other closed type gas heater 110 via the fire spreading section 102.

In this way, in the combustion chamber 128, a combustion gas introduced from the introduction hole (the through-hole 122d of the disposition plate 122) is combusted. Then, combustion continues in both of the combustion chambers 128, and the exhaust gas generated by the combustion is guided to the guide section 142.

The guide section 142 is a flow path formed by the aperture between the heating plate 120 and the partition plate 124 using the heating plate 120 and the partition plate 124 as sidewalls. The guide section 142 continues to the combustion chamber 128 and comes in communication with the second pipeline section 138, collects the exhaust gas generated by the combustion in the combustion chamber 128 at a central side in the surface direction from the combustion chamber 128, and guides the exhaust gas to the outside of the closed type gas heater 110 from the exhaust hole 124b of the partition plate 124 via the second pipeline section 138.

The heating plate 120 is heated from the back surface 120c of the first radiation surface 120a by combustion heat in the combustion chamber 128 and heat of the exhaust gas flowing through the combustion chamber 128 and the guide section 142. Then, the baking object is heated by the heat radiated from the first radiation surface 120a.

In addition, since the partition plate 124 is formed of a material having relatively better thermal conductivity, the exhaust gas flowing through the guide section 142 transfers heat to the fuel gas flowing through the introduction section 140 via the partition plate 124 (see FIG. 3B). In particular, since the exhaust gas flowing through the guide section 142 and the fuel gas flowing through the introduction section 140 form counter flows with the partition plate 124 sandwiched therebetween, the fuel gas can be efficiently preheated by the heat of the exhaust gas, and thus high thermal efficiency can be obtained.

Similarly, the exhaust gas flowing through the second pipeline section 138 flows through the first pipeline section 136 through the second pipeline section 138 to transfer heat to the fuel gas that is a counter flow, preheating the fuel gas. Combustion of the fuel gas is stabilized by so-called excess enthalpy combustion in which the fuel gas is preheated and combusted in this way, and concentration of CO (carbon monoxide) generated by imperfect combustion can be limited to an extremely low concentration.

Next, a continuous heating furnace 200 in which the plurality of closed type gas heater systems 100 are disposed will be described.

Figure 5:
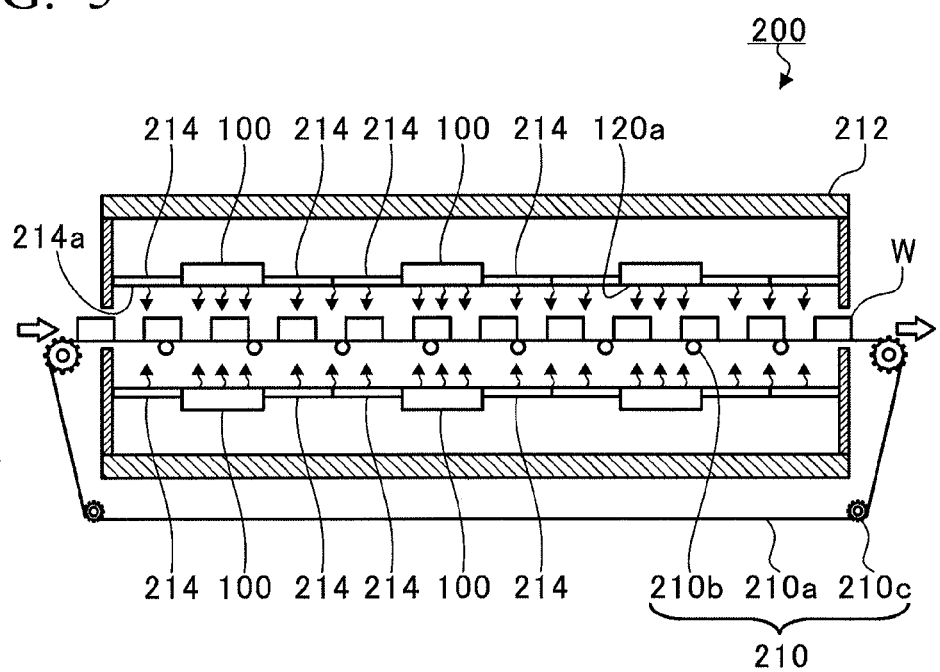
FIG. 5 is a view for describing a continuous heating furnace.

FIG. 5 is a view for describing the continuous heating furnace 200, showing a schematic view of a cross section in a direction parallel to and perpendicular to the conveyance direction of a baking object W in the continuous heating furnace 200. As shown in FIG. 5, the continuous heating furnace 200 is configured to include a conveyance unit 210, a furnace main body 212, a plurality of closed type gas heater systems 100 and a plurality of exhaust heat transfer units 214.

For example, the conveyance unit 210 is configured to include a conveyor 210a such as a belt or the like, rollers 210b configured to support the conveyor 210a in a stretched state, a motor mechanism 210c having a gear and a motor, and so on. The conveyor 210a is rotated by power of the motor mechanism 210c, and the baking object W is conveyed in a direction of a white arrow of FIG. 5. While the baking object W is placed on the conveyance unit 210 in FIG. 5, for example, the baking object W may be suspended by a suspension mechanism (not shown) installed at the conveyance unit 210. In addition, for example, the conveyor 210a may have a mesh structure or the like such that the radiant heat from the closed type gas heater system 100 and the exhaust heat transfer unit 214 disposed at a vertical lower side are easily transferred to the baking object W.

In addition, the rollers 210b support a part of the conveyor 210a in the furnace main body 212 from a vertical lower side. Further, when the conveyor is constituted by a pair of nets that sandwich upper and lower sides of the baking object W in order to limit the bending of the baking object W, the rollers 210b may be installed outside the pair of nets.

The furnace main body 212 partially or entirely surrounds the conveyor 210a, and a baking space is formed therein. In addition, in the closed type gas heater system 100, the plurality of first radiation surfaces 120a are disposed in parallel to a conveyance direction of the baking object W (hereinafter, simply referred to as "a conveyance direction") while the first radiation surfaces 120a are positioned opposite to the conveyor 210a in the furnace main body 212 at a vertical upper side and a vertical lower side of the conveyance unit 210 in the furnace main body 212.

The exhaust heat transfer units 214 are adjacently installed at a front side (in FIG. 5, a right side) and a rear side (in FIG. 5, a left side) in the conveyance direction with respect to the one in the closed type gas heater system 100 (the closed type gas heaters 110) in the furnace main body 212.

In addition, the exhaust heat transfer unit 214 has a second radiation surface 214a configured to transfer the radiant heat to the baking object W heated by the exhaust gas, and like the closed type gas heater system 100, the second radiation surface 214a is disposed in parallel to the conveyance direction while the second radiation surface 214a is opposite to the conveyor 210a in the furnace main body 212.

Figure 6:
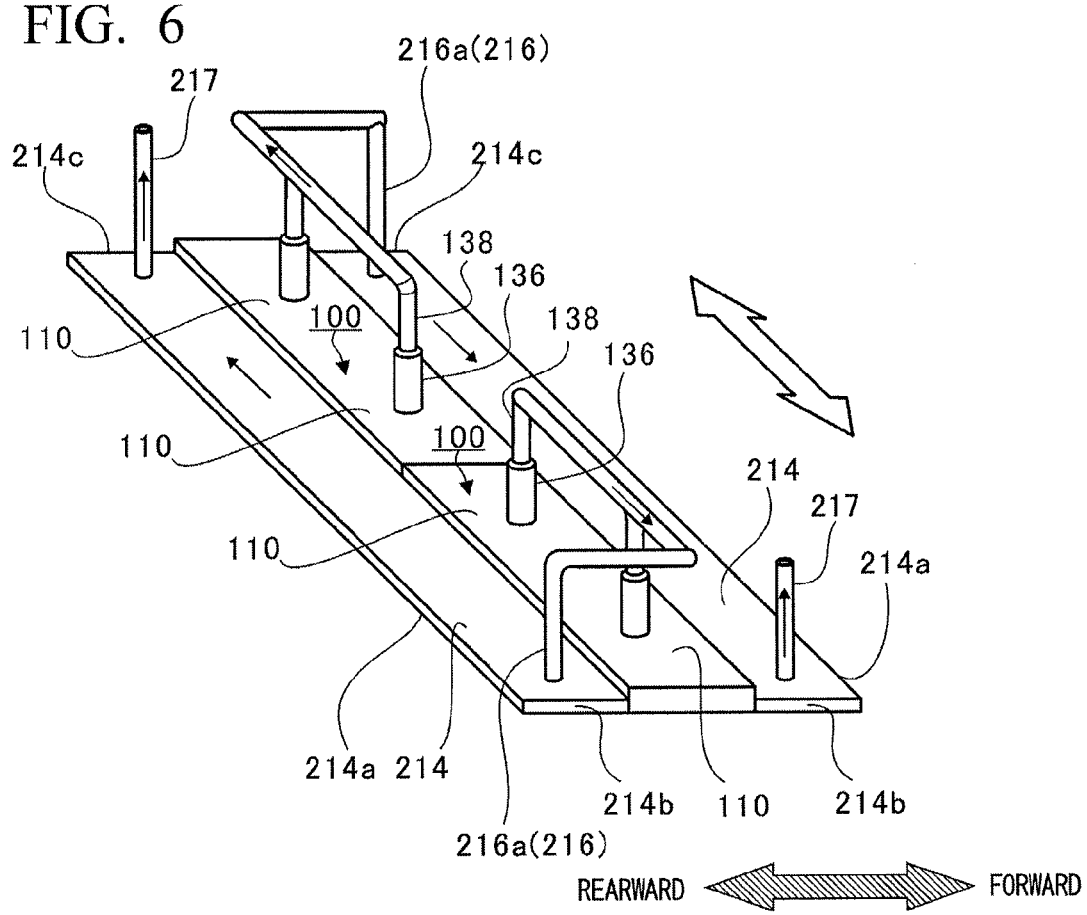
FIG. 6 is a perspective view for describing disposition of the closed type gas heater system and an exhaust heat transfer unit.

FIG. 6 is a view for describing disposition of the closed type gas heater system 100 and the exhaust heat transfer units 214. In FIG. 6, for the purpose of easy understanding of a connecting relation between the exhaust heat transfer unit 214 and the second pipeline section 138, a view of a portion of the first pipeline section 136 is omitted, and the flow of the exhaust gas is represented by a solid arrow.

As shown in FIG. 6, the closed type gas heater system 100 is disposed such that a direction in which the closed type gas heaters 110 are continuously installed becomes the width direction of the furnace main body 212 (a horizontal direction perpendicular to the conveyance direction, in FIG. 6, a direction represented by both white arrows; hereinafter, simply referred to as "a width direction"). In addition, in the furnace main body 212, the two closed type gas heater systems 100 are continuously installed in the width direction. Accordingly, the four closed type gas heaters 110 are adjacently disposed in the width direction.

Figure 7:
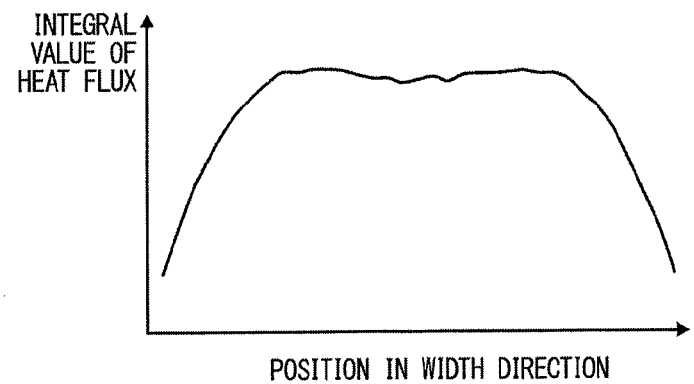
FIG. 7 is a view for describing a heat flux to a baking object from two closed type gas heater systems continuously installed in a width direction.

FIG. 7 is a view for describing heat flux to the baking object W from the two closed type gas heater systems 100 continuously installed in the width direction, showing a position in the width direction on a horizontal axis, and showing an integrated value of the heat flux to the baking object W on the vertical axis.

As shown in FIG. 7, the heat flux is reduced at both end sides in the width direction of the furnace main body 212. This is caused by radiation from both ends (left and right walls) in the width direction of the furnace main body 212. Here, in the embodiment, as the heat transfer from the exhaust heat transfer unit 214 to the furnace main body 212 is deflected, temperature distribution in the furnace main body 212 is uniformized.

As shown in FIG. 6, the length in the width direction of the exhaust heat transfer unit 214 is approximately equal to the sum of lengths in the width direction of the two closed type gas heater systems 100. In addition, the exhaust heat transfer unit 214 comes in communication with the second pipeline sections 138 of the closed type gas heater systems 100 adjacently installed in the conveyance direction. Specifically, the exhaust heat transfer unit 214 comes in communication with the exhaust hole 124b (see FIG. 3B) formed in the partition plate 124 of the one closed type gas heater 110 of the two closed type gas heaters 110 that constitute the closed type gas heater system 100.

In addition, one of the second pipeline sections 138 of the two closed type gas heater systems 100 continuously installed in the width direction comes in communication with the exhaust heat transfer units 214 adjacently installed at a front side in the conveyance direction of the closed type gas heater system 100 via a heat transfer acceleration unit 216, and the other second pipeline section 138 comes in communication with the exhaust heat transfer units 214 adjacently installed at a rear side via the heat transfer acceleration unit 216.

That is, the same number of exhaust heat transfer units 214 as the closed type gas heater systems 100 are installed in the furnace main body 212, and the exhaust heat transfer unit 214 comes in communication with the second pipeline sections 138 connected to the closed type gas heater systems 100 different from each other.

The heat transfer acceleration unit 216 is constituted by an introduction path 216a connected to the second pipeline section 138 and configured to introduce the exhaust gas discharged from the second pipeline section 138 into the exhaust heat transfer unit 214. The introduction path 216a is a flow path formed of a pipeline that connects the second pipeline section 138 and the exhaust heat transfer unit 214. The exhaust gas introduced from the introduction path 216a into the exhaust heat transfer unit 214 flows through the exhaust heat transfer unit 214 and is discharged to the exhaust outlet conduit 217.

Further, an outlet of the exhaust heat transfer unit 214 side of the introduction path 216a extending from each of the closed type gas heater systems 100 is disposed at either one end 214b side or the other end 214c side in the width direction of the second radiation surface 214a. As a result, with respect to the two closed type gas heater systems 100 continuously installed in the width direction, in the exhaust heat transfer units 214 adjacently installed at the front side in the conveyance direction and the exhaust heat transfer units 214 adjacently installed at the rear side in the conveyance direction, positions of the outlets of the introduction paths 216a are opposite to each other in the width direction.

That is, in the two closed type gas heater systems 100 continuously installed in the width direction, directions of the exhaust gas flowing through the exhaust heat transfer unit 214 are opposite to each other in the width direction by the exhaust heat transfer units 214 installed at the front side in the conveyance direction and the exhaust heat transfer units 214 installed at the rear side in the conveyance direction.

Then, the introduction paths 216a are disposed perpendicularly to the second radiation surface 214a, rather than in parallel. That is, the introduction path 216a is connected to the exhaust heat transfer unit 214 perpendicularly to the second radiation surface 214a. For this reason, the exhaust gas flowing into the exhaust heat transfer unit 214 from the heat transfer acceleration unit 216 collides with the back side of the second radiation surface 214a. In other words, the heat transfer acceleration unit 216 is disposed at a position at which the exhaust gas from the introduction path 216a collides with the back side of the second radiation surface 214a.

As the exhaust gas collides with the back side of the second radiation surface 214a, heat transfer to the second radiation surface 214a is accelerated.

Figure 8A:
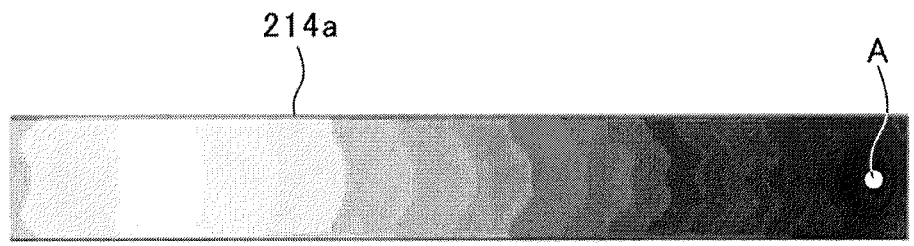
FIG. 8A is a view for describing a heat transfer acceleration effect by a heat transfer acceleration unit.
Figure 8B:
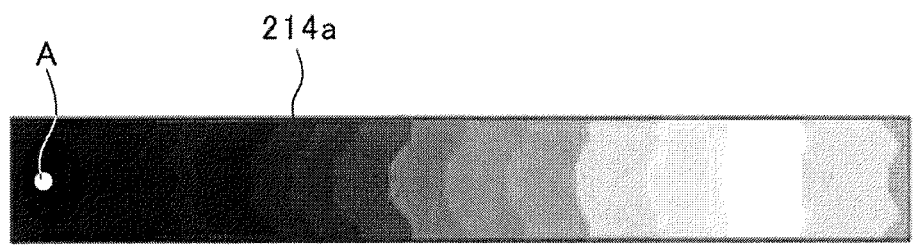
FIG. 8B is a view for describing the heat transfer acceleration effect by the heat transfer acceleration unit.

FIGS. 8A and 8B are views for describing a heat transfer acceleration effect by the heat transfer acceleration unit 216, showing temperature distributions of the second radiation surfaces 214a of the two exhaust heat transfer units 214 adjacently installed in the same closed type gas heater system 100. In FIGS. 8A and 8B, temperature distributions are represented by light and shades of gray, deeper shades of gray (approaching black) represent higher temperatures, and lighter shades of gray (approaching white) represent lower temperatures. In addition, opposite portions A of the introduction paths 216a are represented by white circles.

In FIG. 8A, the outlet of the introduction path 216a is disposed on the right in the drawing, and in FIG. 8B, the outlet of the introduction path 216a is disposed on the left in the drawing. As shown in FIGS. 8A and 8B, in the second radiation surface 214a, a portion of the outlet side (the heat transfer acceleration unit 216 side: an introduction side of the exhaust gas) of the introduction path 216a has a temperature higher than that of a portion of an opposite side (a discharge side of the exhaust gas).

Figure 9:
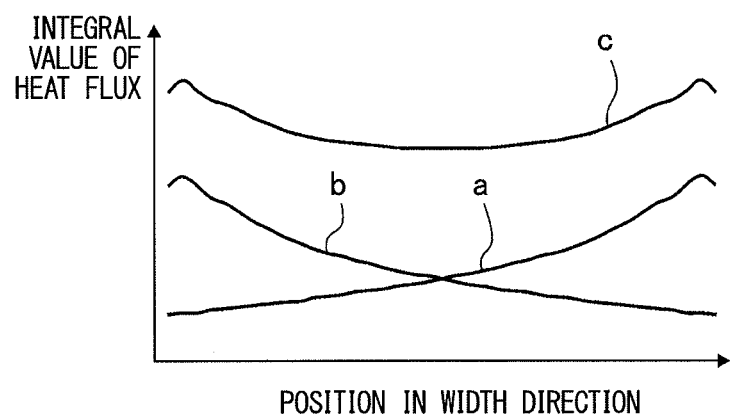
FIG. 9 is a view for describing the heat flux to the baking object from the two exhaust heat transfer units shown in FIGS. 8A and 8B.

FIG. 9 is a view for describing the heat flux from the two exhaust heat transfer units 214 shown in FIGS. 8A and 8B to the baking object W, a position in the width direction is shown on a horizontal axis, and an integrated value of the heat flux to the baking object W is shown on a vertical axis.

In FIG. 9, an explanatory note a represents an integrated value of the heat flux from the exhaust heat transfer unit 214 shown in FIG. 8A, an explanatory note b represents an integrated value of the heat flux from the exhaust heat transfer unit 214 shown in FIG. 8B, and an explanatory note c represents a sum of the integrated values of the heat fluxes of the explanatory notes a and b.

As shown in FIG. 9, the integrated value of the heat flux from the exhaust heat transfer unit 214 is high on the right and low on the left in FIG. 9 in which the heat transfer acceleration unit 216 is disposed on the explanatory note a. In addition, the integrated value is high on the left and low on the right in FIG. 9 in which the heat transfer acceleration unit 216 is disposed on the explanatory note b. As a result, as shown in the explanatory note c, the sum of the integrated values of the explanatory notes a and b is low in the center and high on both of the right and the left in FIG. 9.

In this way, the heat transfer acceleration unit 216 accelerates heat transfer from the exhaust gas to the second radiation surface 214a at the one end 214b side or the other end 214c side in a direction perpendicular to the conveyance direction of the second radiation surface 214a.

In the embodiment, as described above, the heat transfer acceleration unit 216 is installed at end sides in the width direction of the second radiation surfaces 214a, i.e., left and right wall sides of the furnace main body 212. For this reason, the temperature is increased at the end sides in the width direction of the second radiation surface 214a to offset the radiation from the left and right walls of the furnace main body 212, and the temperature distribution in the furnace main body 212 can be uniformized. In addition, heat transfer from the second radiation surface 214a to both end sides of the baking object W is also accelerated, and the baking object W can be uniformly heated.

In particular, in the embodiment, the positions of the heat transfer acceleration units 216 (the outlets of the introduction paths 216a) of the exhaust heat transfer units 214 are alternately varied at the exhaust heat transfer units 214 arranged in the conveyance direction at the one end 214b side and the other end 214c side in the width direction of the second radiation surface 214a. For this reason, the left and right wall sides of the furnace main body 212 can be uniformly heated.

In addition, the closed type gas heater 110 is divided by the closed type gas heater system 100 (unit) constituted by the two closed type gas heaters 110, and includes the exhaust heat transfer unit 214 at each of the closed type gas heater systems 100.

For this reason, as the exhaust gases discharged from the exhaust heat transfer units 214 are separately measured, in comparison with the case in which the exhaust gases discharged from the plurality of closed type gas heater systems are discharged together, the closed type gas heater system 100 that causes inconvenience can be easily identified. Furthermore, in each of the closed type gas heater systems 100, maintenance in which a mixing ratio of the air and the town gas or the like that constitute the fuel gas is measured and adjusted becomes easy.

Moreover, as described above, the plurality of closed type gas heater systems 100 and the plurality of exhaust heat transfer units 214 are continuously installed in the conveyance direction as the first radiation surfaces 120a and the second radiation surfaces 214a are opposite to the conveyor 210a in the furnace main body 212. Since sets of the closed type gas heater systems 100 and the exhaust heat transfer units 214 are disposed at both of the vertical upper side and the vertical lower side of the conveyor 210a in the furnace main body 212, in the space sandwiched between the closed type gas heater system 100 and the exhaust heat transfer unit 214, a convection current in the vertical direction is reduced and the temperature of the atmosphere around the baking object W is maintained high to improve the thermal efficiency.

Figure 10A:
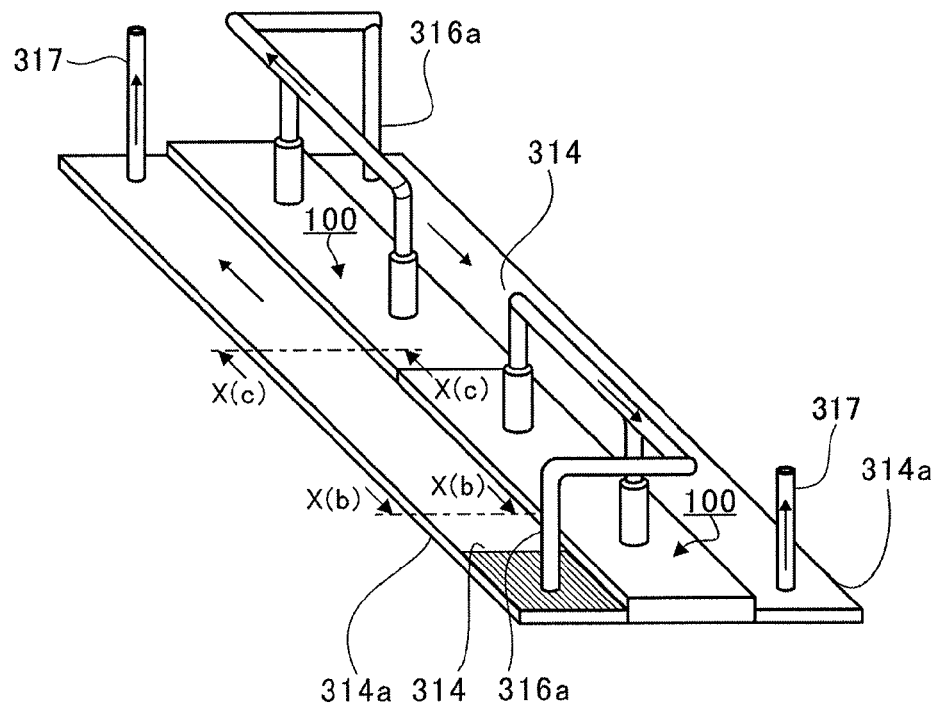
FIG. 10A is a perspective view for describing a variant of the exhaust heat transfer unit of the closed type gas heater system.
Figure 10B:
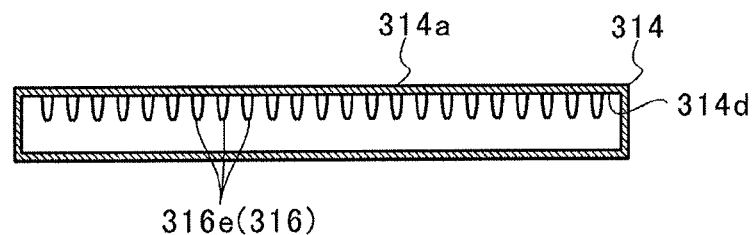
FIG. 10B is a cross-sectional view of the exhaust heat transfer unit taken along line X(b)-X(b) of FIG. 10A.
Figure 10C:
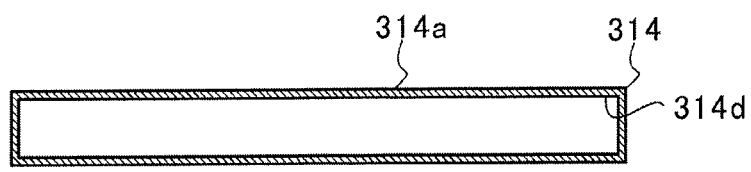
FIG. 10C is a cross-sectional view of the exhaust heat transfer unit taken along line X(c)-X(c) of FIG. 10A.

FIGS. 10A to 10C are views for describing an exhaust heat transfer unit 314 according to a variant of the present disclosure, FIG. 10A shows a perspective view of the closed type gas heater system 100 and the exhaust heat transfer unit 314, FIG. 10B shows a cross section of the exhaust heat transfer unit 314 taken along line X(b)-X(b) of FIG. 10A, and FIG. 10C shows a cross section of the exhaust heat transfer unit 314 taken along line X(c)-X(c) of FIG. 10A.

As shown in FIG. 10B, projections 316e (a turbulence section) protruding from a back side (a back surface 314d) of a second radiation surface 314a to an opposite side of the second radiation surface 314a are formed in the exhaust heat transfer unit 314. The projections 316e are formed at a side of the back surface 314d of the second radiation surface 314a at which an outlet of an introduction path 316a is disposed. In FIG. 10A, a position at which the projections 316e are formed is represented by hatching.

Meanwhile, as shown in FIG. 10C, in the back surface 314d of the second radiation surface 314a, an opposite side of the side at which the outlet of the introduction path 316a is disposed has a flat surface without forming the projections 316e.

In this way, for example, as a heat transfer acceleration unit 316 of the variant is constituted by the projections 316e and a flow of the exhaust gas flowing through the exhaust heat transfer unit 314 is disturbed, heat transfer from the exhaust gas to the second radiation surface 314a is accelerated. The exhaust gas introduced from the introduction path 316a into the exhaust heat transfer unit 314 flows through the exhaust heat transfer unit 314 and is discharged to the exhaust outlet conduit 317.

A turbulence flow is generated in the flow of the exhaust gas in the exhaust heat transfer unit 314 by the projections 316e, and heat transfer from the exhaust gas to the second radiation surface 314a in the heat transfer acceleration unit 316 is accelerated.

In addition, even a surface area of the portion at which the projection 316e is formed in the flow path with respect to a flow path volume is larger than that of the portion at which the projection 316e is not formed, the heat transfer is accelerated. For this reason, like the above-mentioned embodiment, the temperature distribution in the furnace main body 212 is uniformized, the heat transfer from the second radiation surface 314a to both end sides of the baking object W is further accelerated, and thus the baking object W can be uniformly heated.

While an exemplary embodiment of the present disclosure has been described above with reference to the accompanying drawings, it is needless to say that the present disclosure is not limited to this embodiment. It will be apparent to those skilled in the art that various modifications and amendments may be made without departing from the spirit of the present disclosure and fall under the scope of the present disclosure.

For example, the closed type gas heater 110 is not limited to the above-mentioned configuration, but another closed type gas heater that is able to collect an exhaust gas from a combustion chamber and supply the exhaust gas into an exhaust heat transfer unit, for example, a radiant tube burner, a line burner, or the like, may be used.

In addition, in the above-mentioned embodiment and variant, while the case in which the exhaust heat transfer units 214 and 314 in communication with the closed type gas heater system 100 are installed at the front side and the rear side in the conveyance direction of the closed type gas heater system 100 has been described, two exhaust heat transfer units 214 and 314 in communication with the closed type gas heater system 100 may be adjacently installed at either the front side or the rear side of the closed type gas heater system 100.

In this case, a direction of the exhaust gas flowing through the exhaust heat transfer unit 214 is reversed in the width direction in the two exhaust heat transfer units 214 adjacently installed at the front side or the rear side in opposite directions of the closed type gas heater system 100.

In addition, in the above-mentioned embodiment, as an example of the heat transfer acceleration unit 216, the case in which the direction of the outlet side of the introduction path 216a is perpendicular to the second radiation surface 214a has been described. However, even when the direction of the outlet side of the introduction path 216a is not perpendicular to the second radiation surface 214a, the direction may be inclined with respect to the second radiation surface 214a rather than parallel thereto.

In addition, in the above-mentioned variant, the case in which the heat transfer acceleration unit 316 generates the turbulence flow in the flow of the exhaust gas by the projection 316e (the turbulence section) has been described. However, depressions conversely formed with respect to the projections 316e may be formed in the exhaust heat transfer unit 314 to function as the heat transfer acceleration unit or a structure configured to narrow the flow path or improve the flow velocity may be provided as the heat transfer acceleration unit as long as the turbulence flow can be generated in the flow of the exhaust gas.

In addition, in the above-mentioned embodiment and variant, the case in which the heat transfer acceleration unit 216 is provided by the positional relation between the introduction path 216a and the second radiation surface 214a, and the heat transfer acceleration unit 316 has a structure (the projections 316e) in which the turbulence flow is generated in the flow of the exhaust gas. However, the heat transfer acceleration unit may have any structure or any positional relation as long as heat transfer from the exhaust gas to the second radiation surface is accelerated at the one end side or the other end side in the width direction.

In addition, in the above-mentioned embodiment and variant, the closed type gas heater system 100 in which the two closed type gas heaters 110 are continuously installed has been described for example. However, the closed type gas heater 110 may be solely used without the closed type gas heater system 100, or a closed type gas heater system in which three closed type gas heaters 110 are continuously installed may be used.

In addition, in the above-mentioned embodiment and variant, although the case in which the closed type gas heater system 100 is disposed or exchanged one by one has been described, disposition and exchange are not limited to the one closed type gas heater system 100 but the plurality of closed type gas heater systems 100 may be disposed or exchanged. In this case, the one exhaust heat transfer unit is installed at each of the plurality of closed type gas heater systems 100.

In addition, as the load adjustment function is provided at the closed type gas heater system 100 and a caloric value of the two closed type gas heaters 110 that constitute the closed type gas heater system 100 is adjusted, a caloric value in the width direction of the closed type gas heater system 100 and the size of the radiant heat from the second radiation surface 214a may be adjusted.

As the load adjustment function is provided, a thermal dose in the width direction during the operation of the continuous heating furnace 200 can be easily and intentionally adjusted. For example, in order to adjust the thermal dose in the width direction of the continuous heating furnace 200, the caloric value of the two closed type gas heaters 110 may be intentionally made irregular.

As a specific load adjustment function, for example, a flow rate adjustment mechanism such as a valve or an orifice may be disposed at the supply pipe (see reference numeral 236 of FIG. 2) of the fuel gas to the first pipeline section 136 of each of the closed type gas heaters 110.

INDUSTRIAL APPLICABILITY

The present disclosure can be used in the continuous heating furnace configured to combust a fuel and heat a baking object.

The invention claimed is:
1. A continuous heating furnace comprising:
a furnace main body;
a conveyance unit configured to convey a baking object in the furnace main body;
at least one closed type gas heater having an introduction hole into which a fuel gas flows, a combustion chamber in which the fuel gas introduced from the introduction hole is combusted, a guide section configured to guide an exhaust gas generated by combustion in the combustion chamber, a first radiation surface extending in a direction perpendicular to a conveyance direction of the baking object and parallel to a horizontal direction and configured to be heated by the combustion in the combustion chamber and heat of the exhaust gas flowing through the guide section to transfer radiant heat to the baking object, an exhaust hole through which the exhaust gas that heated the first radiation surface is discharged, the at least one closed type gas heater being disposed in the furnace main body, wherein all of the exhaust gas generated by combustion in the combustion chamber is discharged to an area outside of the at least one closed type gas heater from the exhaust hole without coming in direct contact with the baking object; and at least one exhaust heat transfer unit which is juxtaposed with the at least one closed type gas heater in the conveyance direction of the baking object, is disposed in the furnace main body, communicates with the exhaust hole so that the exhaust gas discharged from the exhaust hole flows through the at least one exhaust heat transfer unit, and has a second radiation surface configured to be heated by the exhaust gas discharged from the exhaust hole to transfer the radiant heat to the baking object, and a heat transfer acceleration unit provided at one end portion, in the direction perpendicular to the conveyance direction of the baking object and parallel to the horizontal direction, of the at least one exhaust heat transfer unit and configured to accelerate heat transfer from the exhaust gas discharged from the exhaust hole to one end portion of the second radiation surface, wherein all of the exhaust gas discharged from the exhaust hole passes through the at least one exhaust heat transfer unit and is discharged to an area outside of the at least one exhaust heat transfer unit and the continuous heating furnace without coming in direct contact with the baking object.

2. The continuous heating furnace according to claim 1, wherein the heat transfer acceleration unit includes an introduction path which is connected to the piping section and configured to introduce the exhaust gas discharged from the piping section into the at least one exhaust heat transfer unit, and is perpendicular to or inclined with respect to the second radiation surface such that the exhaust gas from the introduction path collides with a back side of the second radiation surface.

3. The continuous heating furnace according to claim 1, wherein the heat transfer acceleration unit includes a turbulence section provided on a back surface of the second radiation surface and configured to disturb the flow of the exhaust gas flowing through the at least one exhaust heat transfer unit.

4. The continuous heating furnace according to claim 1, wherein:
the at least one exhaust heat transfer unit comprises a plurality of exhaust heat transfer units; and
the at least one closed type gas heater is interposed between the plurality of exhaust heat transfer units, and flow directions of the exhaust gases flowing through the plurality of exhaust heat transfer units are opposite to each other.

5. The continuous heating furnace according to claim 1, wherein:
the at least one exhaust heat transfer unit comprises a plurality of exhaust heat transfer units; and
flow directions of the exhaust gases flowing through adjacent exhaust heat transfer units of the plurality of exhaust heat transfer units are opposite to each other.

6. The continuous heating furnace according to claim 1, wherein:
the at least one closed type gas heater comprises a plurality of closed type gas heaters, the plurality of closed type gas heaters constituting a plurality of closed type gas heater systems; and the at least one exhaust heat transfer unit comprises a plurality of exhaust heat transfer units that are provided for each of the plurality of closed type gas heater systems.

7. The continuous heating furnace according to claim 2, wherein:
the at least one closed type gas heater comprises a plurality of closed type gas heaters, the plurality of closed type gas heaters constituting a plurality of closed type gas heater systems; and the at least one exhaust heat transfer unit comprises a plurality of exhaust heat transfer units that are provided for each of the plurality of closed type gas heater systems.

8. The continuous heating furnace according to claim 3, wherein:
the at least one closed type gas heater comprises a plurality of closed type gas heaters, the plurality of closed type gas heaters constituting a plurality of closed type gas heater systems; and the at least one exhaust heat transfer unit comprises a plurality of exhaust heat transfer units that are provided for each of the plurality of closed type gas heater systems.

9. The continuous heating furnace according to claim 4, wherein:
the at least one closed type gas heater comprises a plurality of closed type gas heaters, the plurality of closed type gas heaters constituting a plurality of closed type gas heater systems; and the at least one exhaust heat transfer unit comprises a plurality of exhaust heat transfer units that are provided for each of the plurality of closed type gas heater systems.

10. The continuous heating furnace according to claim 5, wherein:
the at least one closed type gas heater comprises a plurality of closed type gas heaters, the plurality of closed type gas heaters constituting a plurality of closed type gas heater systems; and the at least one exhaust heat transfer unit comprises a plurality of exhaust heat transfer units that are provided for each of the plurality of closed type gas heater systems.

* * * * *